(12) United States Patent
Johnson

(10) Patent No.: US 11,496,756 B2
(45) Date of Patent: Nov. 8, 2022

(54) METHODS, APPARATUSES, COMPUTER PROGRAMS AND COMPUTER-READABLE MEDIA FOR PROCESSING CONFIGURATION DATA

(71) Applicant: V-NOVA INTERNATIONAL LIMITED, London (GB)

(72) Inventor: Robert Johnson, London (GB)

(73) Assignee: V-NOVA INTERNATIONAL LIMITED

(*) Notice: Subject to any disclaimer, the term of this patent is extended or adjusted under 35 U.S.C. 154(b) by 14 days.

(21) Appl. No.: 17/290,466

(22) PCT Filed: Oct. 30, 2019

(86) PCT No.: PCT/GB2019/053068
§ 371 (c)(1),
(2) Date: Apr. 30, 2021

(87) PCT Pub. No.: WO2020/089616
PCT Pub. Date: May 7, 2020

(65) Prior Publication Data
US 2021/0385468 A1    Dec. 9, 2021

(30) Foreign Application Priority Data

Oct. 31, 2018  (GB) ..................... 1817783

(51) Int. Cl.
*H04N 19/30*    (2014.01)
*H04N 19/463*   (2014.01)
*H04N 19/70*    (2014.01)

(52) U.S. Cl.
CPC ........... *H04N 19/30* (2014.11); *H04N 19/463* (2014.11); *H04N 19/70* (2014.11)

(58) Field of Classification Search
CPC ....... H04N 19/30; H04N 19/463; H04N 19/70
See application file for complete search history.

(56) References Cited

U.S. PATENT DOCUMENTS

2012/0113811 A1* 5/2012 Bao ..................... H04W 24/00
                                                           370/241
2015/0195582 A1    7/2015 Moriya et al.
(Continued)

OTHER PUBLICATIONS

International Search Report and Written Opinion for PCT/GB2019/053068 dated Mar. 4, 2020.
(Continued)

*Primary Examiner* — Jae N Noh
(74) *Attorney, Agent, or Firm* — Workman Nydegger

(57) ABSTRACT

Configuration data is obtained and is useable by a decoder to reconstruct a first representation of an image at a first level of quality using a second representation of the image at the first level of quality. The second representation is based on a representation of the image at a second, lower level of quality. The configuration data comprises a value of a configuration parameter, the value having a variable bit-length. The configuration data is arranged into a sequence of bytes comprising a variable-length element arranged to store the value of the configuration parameter. The variable-length element comprises at least one given byte having one or more predetermined bits arranged to indicate whether or not the variable-length element comprises one or more additional bytes to the at least one given byte. The sequence of bytes is output for processing by the decoder.

20 Claims, 7 Drawing Sheets

(56) References Cited

U.S. PATENT DOCUMENTS

2015/0373374 A1    12/2015  Ramasubramonian et al.
2017/0310989 A1    10/2017  Ugur et al.
2018/0213216 A1*   7/2018   Hwang ................ H04N 13/178

OTHER PUBLICATIONS

Rosewarne et al., "High Efficiency Video Coding (HEVC) Test Model 16 (HM 16) Update 2 of Encoder Description", 20, JCT-VC Meeting; Feb. 10, 2015 to Feb. 18, 2015, Geneva, Joint Collaborative Team on Video Coding of ISO/IEC JTC1/SC29/WG11 and ITU-T SG.16), URL: http://wftp3.itu.int/av-arch/jctvc-site/, No. JCTVC-T1002, Jun. 2, 2015, XP030117409.

* cited by examiner

METHODS, APPARATUSES, COMPUTER PROGRAMS AND COMPUTER-READABLE MEDIA FOR PROCESSING CONFIGURATION DATA

CROSS-REFERENCE TO RELATED APPLICATIONS

The present application is a 371 US Nationalization of International Application No. PCT/GB2019/053068, filed Oct. 30, 2019, which claims priority to United Kingdom Patent Application No. 1817783.2, filed Oct. 31, 2018, the disclosures of which are hereby incorporated by reference herein in their entirety.

TECHNICAL FIELD

This invention relates to methods, apparatuses, computer programs and computer-readable media. In particular, but not exclusively, this invention relates to methods, apparatuses, computer programs and computer-readable media for use in the processing of configuration information that relates to residual data useable to reconstruct a representation of an image at a relatively high level of quality.

BACKGROUND

Compression and decompression of signals is a consideration in many known systems. Many types of signal, for example video, may be compressed and encoded for transmission, for example over a data communications network. When such a signal is decoded, it may be desired to increase a level of quality of the signal and/or recover as much of the information contained in the original signal as possible.

Some known systems exploit scalable encoding techniques. Scalable encoding involves encoding a signal along with information to allow the reconstruction of the signal at one or more different levels of quality, for example depending on the capabilities of the decoder and the available bandwidth.

There are several considerations relating to the reconstruction of signals in a scalable encoding system. One such consideration is the amount of information that is stored, used and/or transmitted. The amount of information may vary, for example depending on the desired level of quality of the reconstructed signal, the nature of the information that is used in the reconstruction, and/or how such information is configured. Another consideration is the ability of the encoder and/or the decoder to process information efficiently. The efficiency with which the encoder and/or the decoder processes information may be a factor in the performance level of the encoder and/or the decoder.

SUMMARY

Various aspects of the present invention are set out in the appended claims.

Further features and advantages will become apparent from the following description of preferred embodiments, given by way of example only, which is made with reference to the accompanying drawings.

DETAILED DESCRIPTION

Figure 1:
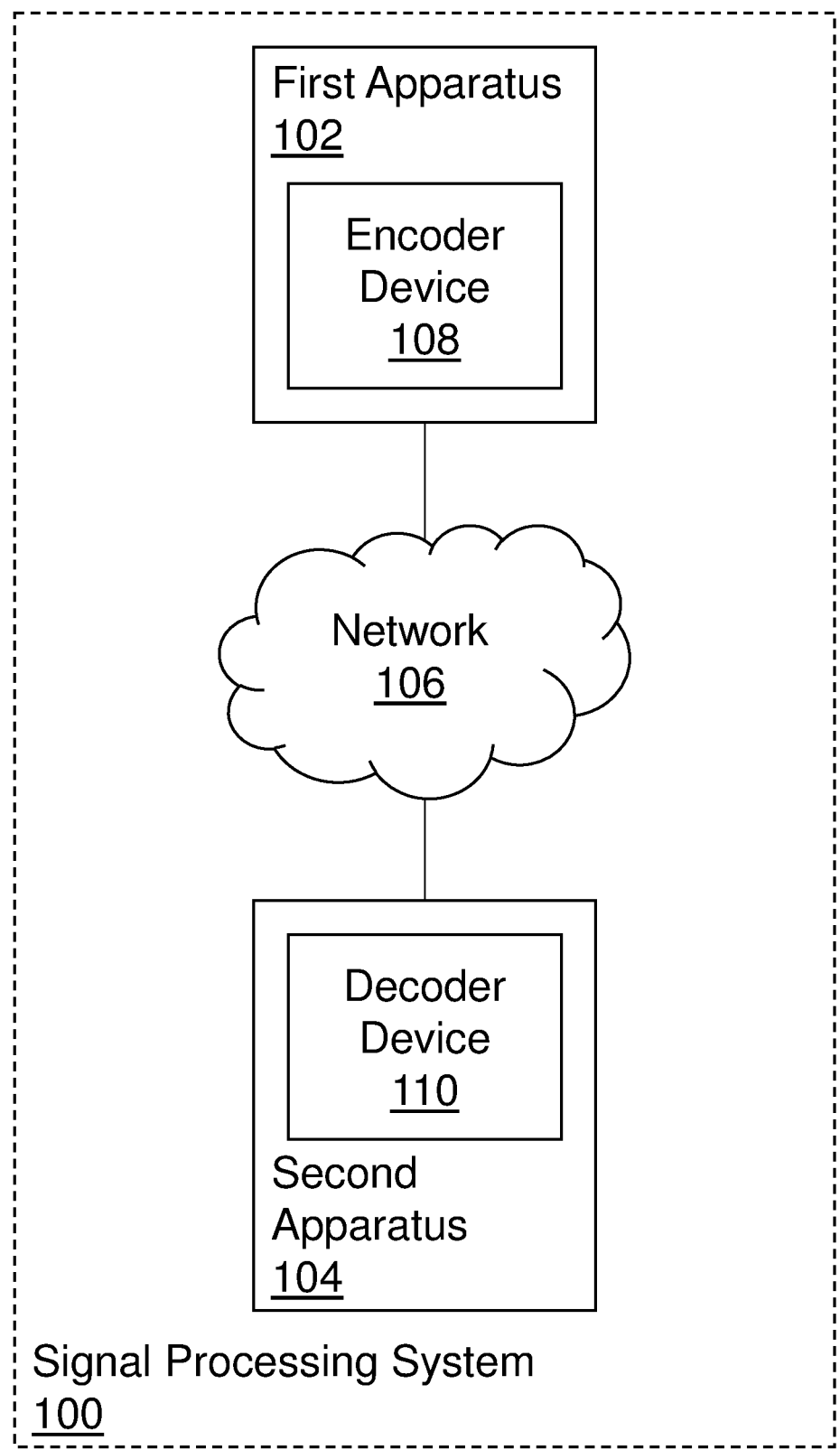
FIG. 1 shows a schematic block diagram of an example of a signal processing system in accordance with an embodiment of the present invention.

Referring to FIG. 1, there is shown an example of a signal processing system 100. The signal processing system 100 is used to process signals. Examples of types of signal include, but are not limited to, video signals, image signals, audio signals, volumetric signals such as those used in medical, scientific or holographic imaging, or other multidimensional signals.

The signal processing system 100 includes a first apparatus 102 and a second apparatus 104. The first apparatus 102 and second apparatus 104 may have a client-server relationship, with the first apparatus 102 performing the functions of a server device and the second apparatus 104 performing the functions of a client device. The signal processing system 100 may include at least one additional apparatus (not shown). The first apparatus 102 and/or second apparatus 104 may comprise one or more components. The one or more components may be implemented in hardware and/or software. The one or more components may be co-located or may be located remotely from each other in the signal processing system 100. Examples of types of apparatus include, but are not limited to, computerised devices, handheld or laptop computers, tablets, mobile devices, games consoles, smart televisions, set-top boxes, augmented and/or virtual reality headsets etc.

The first apparatus 102 is communicatively coupled to the second apparatus 104 via a data communications network 106. Examples of the data communications network 106 include, but are not limited to, the Internet, a Local Area Network (LAN) and a Wide Area Network (WAN). The first and/or second apparatus 102, 104 may have a wired and/or wireless connection to the data communications network 106.

The first apparatus 102 comprises an encoder 108. The encoder 108 is configured to encode data comprised in the signal, which is referred to hereinafter as "signal data". For example, where the signal is a video signal, the encoder 108 is configured to encode video data. Video data comprises a sequence of multiple images or frames. The encoder 108 may perform one or more further functions in addition to encoding signal data. The encoder 108 may be embodied in various different ways. For example, the encoder 108 may be embodied in hardware and/or software.

Although in this example the first apparatus 102 comprises the encoder 108, in other examples the first apparatus 102 is separate from the encoder 108. In such examples, the first apparatus 102 is communicatively coupled to the encoder 108. The first apparatus 102 may be embodied as one or more software functions and/or hardware modules.

The second apparatus 104 comprises a decoder 110. The decoder 110 is configured to decode signal data. The decoder 110 may perform one or more further functions in addition to decoding signal data. The decoder 110 may be embodied in various different ways. For example, the decoder 110 may be embodied in hardware and/or software.

Although in this example the second apparatus 104 comprises the decoder 110, in other examples, the second apparatus 104 is separate from the decoder 110. In such examples, the second apparatus 104 is communicatively coupled to the decoder 110. The second apparatus 104 may be embodied as one or more software functions and/or hardware modules.

The encoder 108 encodes signal data and transmits the encoded signal data to the decoder 110 via the data communications network 106. The decoder 110 decodes the received, encoded signal data and generates decoded signal data. The decoder 110 may output the decoded signal data, or data derived using the decoded signal data. For example, the decoder 110 may output such data for display on one or more display devices associated with the second apparatus 104.

In some examples described herein, the encoder 108 transmits to the decoder 110 a representation of a signal at a given level of quality and information the decoder 110 can use to reconstruct a representation of the signal at one or more higher levels of quality. Such information may be referred to as "reconstruction data". In some examples, "reconstruction" of a representation involves obtaining a representation that is not an exact replica of an original representation. The extent to which the representation is the same as the original representation may depend on various factors including, but not limited to, quantisation levels. A representation of a signal at a given level of quality may be considered to be a rendition, version or depiction of data comprised in the signal at the given level of quality. In some examples, the reconstruction data is included in the signal data that is encoded by the encoder 108 and transmitted to the decoder 110. For example, the reconstruction data may be in the form of metadata. In some examples, the reconstruction data is encoded and transmitted separately from the signal data.

The information the decoder 110 uses to reconstruct the representation of the signal at the one or more higher levels of quality may comprise residual data, as described in more detail below. Residual data is an example of reconstruction data. The information the decoder 110 uses to reconstruct the representation of the signal at the one or more higher levels of quality may also comprise configuration data relating to processing of the residual data. The configuration data may indicate how the residual data has been processed by the encoder 108 and/or how the residual data is to be processed by the decoder 110. The configuration data may be signaled to the decoder 110, for example in the form of metadata.

Figure 2A:
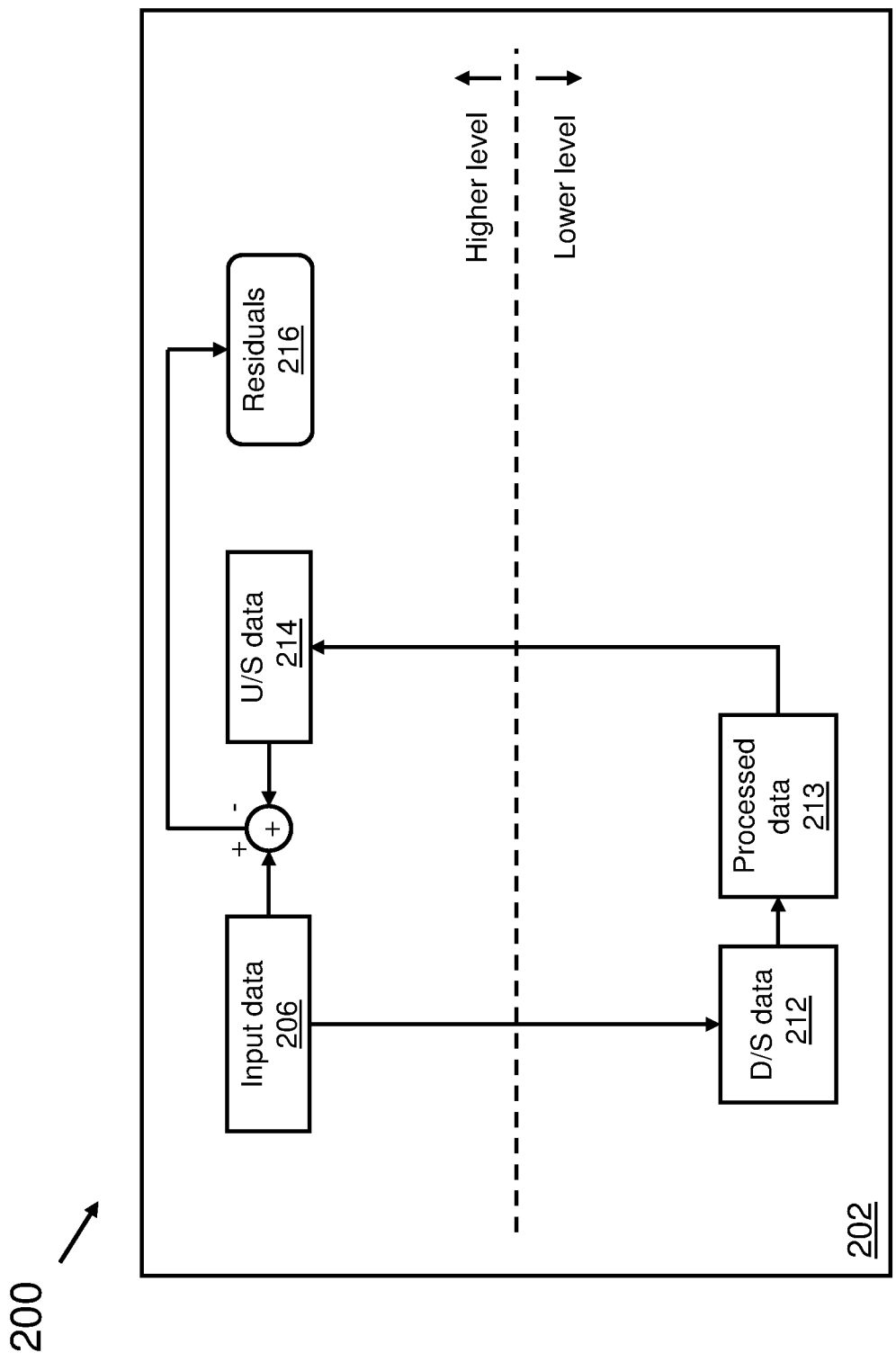
FIGS. 2A and 2B show a schematic block diagram of another example of a signal processing system in accordance with an embodiment of the present invention.
Figure 2B:
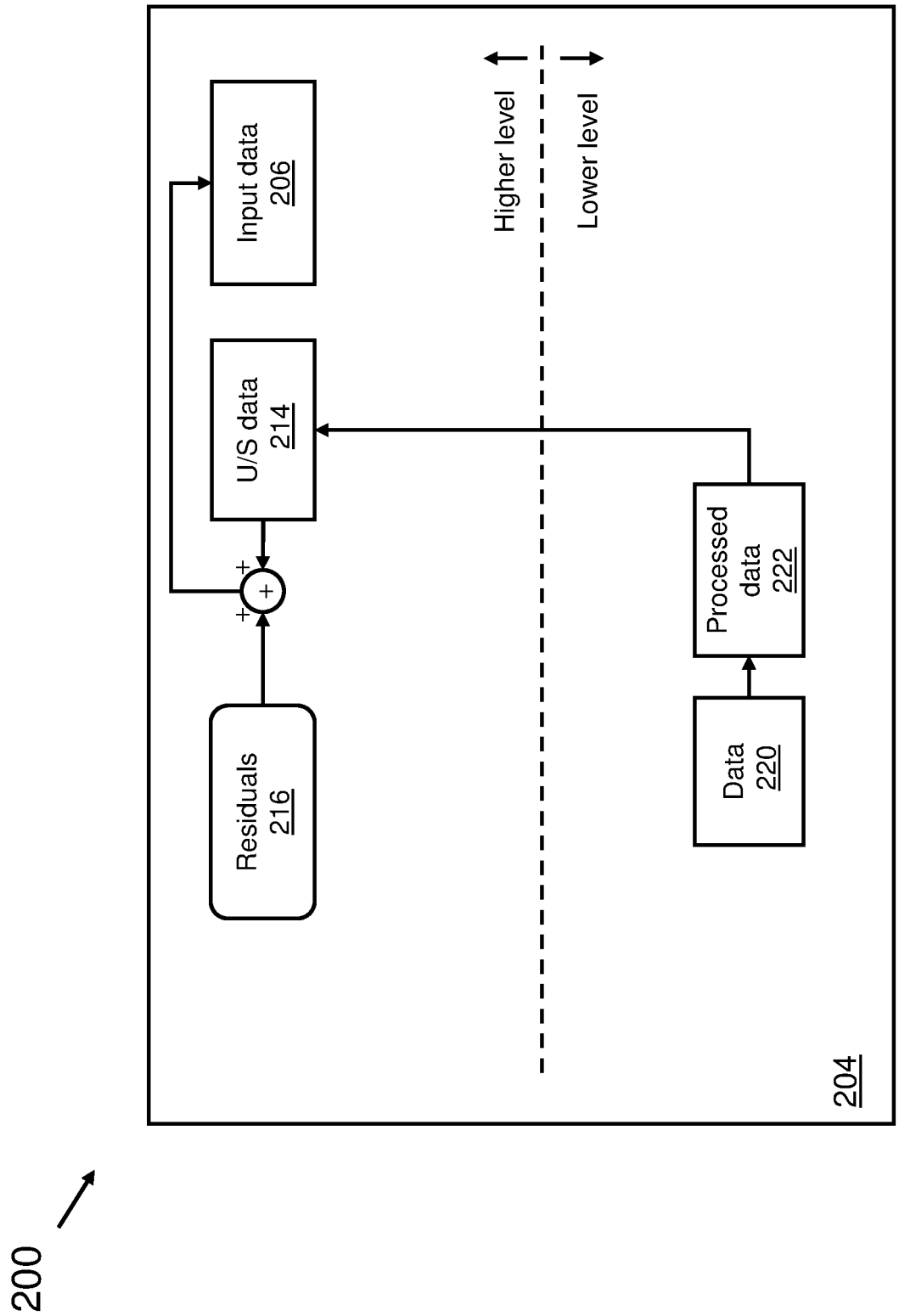

Referring to FIGS. 2A and 2B, there is shown schematically an example of a signal processing system 200. The signal processing system 200 includes a first apparatus 202 comprising an encoder and a second apparatus 204 comprising a decoder. In each of the first apparatus 202 and the second apparatus 204, items are shown on two logical levels. The two levels are separated by a dashed line. Items on the first, highest level relate to data at a relatively high level of quality. Items on the second, lowest level relate to data at a relatively low level of quality. The relatively high and relatively low levels of quality relate to a tiered hierarchy having multiple levels of quality. In some examples, the tiered hierarchy comprises more than two levels of quality.

In such examples, the first apparatus 202 and the second apparatus 204 may include more than two different levels. There may be one or more other levels above and/or below those depicted in FIGS. 2A and 2B.

Referring first to FIG. 2A, the first apparatus 202 obtains a first representation of an image at a relatively high level of quality 206. A representation of a given image is a representation of data comprised in the image. The image may be a given frame of a video. The first representation of the image at the relatively high level of quality 206 will be referred to as "input data" hereinafter as, in this example, it is data provided as an input to the encoder in the first apparatus 202. The first apparatus 202 may receive the input data 206. For example, the first apparatus 202 may receive the input data 206 from at least one other apparatus. The first apparatus 202 may be configured to receive successive portions of input data 206, e.g. successive frames of a video, and to perform the operations described herein to each successive frame. For example, a video may comprise frames $F_1, F_2, \ldots F_T$ and the first apparatus 202 may process each of these in turn.

The first apparatus 202 derives data 212 based on the input data 206. In this example, the data 212 based on the input data 206 is a representation 212 of the image at the relatively low level of quality. In this example, the data 212 is derived by performing a downsampling operation on the input data 206 and will therefore be referred to as "downsampled data" hereinafter. In other examples, the data 212 is derived by performing an operation other than a downsampling operation on the input data 206.

In this example, the downsampled data 212 is processed to generate processed data 213 at the relatively low level of quality. In other examples, the downsampled data 212 is not processed at the relatively low level of quality. As such, the first apparatus 202 may generate data at the relatively low level of quality, where the data at the relatively low level of quality comprises the downsampled data 212 or the processed data 213.

In some examples, generating the processed data 213 involves encoding the downsampled data 212. Encoding the downsampled data 212 produces an encoded image at the relatively low level of quality. The first apparatus 202 may output the encoded image, for example for transmission to the second apparatus 204. A series of encoded images, e.g. forming an encoded video, as output for transmission to the second apparatus 204 may be referred to as a "base" stream. Instead of being produced in the first apparatus 202, the encoded image may be produced by an encoding device that is separate from the first apparatus 202. The encoded image may be part of an H.264 encoded video. Generating the processed data 213 may, for example, comprise generating successive frames of video as output by a separate encoding device such as an H.264 video encoder. An intermediate set of data for the generation of the processed data 213 may comprise the output of such an encoder, as opposed to any intermediate data generated by the separate encoding device.

Generating the processed data 213 at the relatively low level of quality may further involve decoding the encoded image at the relatively low level of quality. The decoding operation may be performed to emulate a decoding operation at the second apparatus 204, as will become apparent below. Decoding the encoded image produces a decoded image at the relatively low level of quality. In some examples, the first apparatus 202 decodes the encoded image at the relatively low level of quality to produce the decoded image at the relatively low level of quality. In other examples, the first apparatus 202 receives the decoded image at the relatively low level of quality, for example from an encoding and/or decoding device that is separate from the first apparatus 202. The encoded image may be decoded using an H.264 decoder. The decoding by a separate decoding device may comprise inputting encoded video, such as an encoded data stream configured for transmission to a remote decoding device, into a separate black-box decoder implemented together with the first apparatus 202 to generate successive decoded frames of video. Processed data 213 may thus comprise a frame of video data that is generated via a complex non-linear encoding and decoding process, where the encoding and decoding process may involve modelling spatio-temporal correlations as per a particular encoding standard such as H.264. However, because the output of any encoder is fed into a corresponding decoder, this complexity is effectively hidden from the first apparatus 202.

In an example, generating the processed data 213 at the relatively low level of quality further involves obtaining correction data based on a comparison between the downsampled data 212 and the decoded image obtained by the first apparatus 202, for example based on the difference between the downsampled data 212 and the decoded image. The correction data can be used to correct for errors introduced in encoding and decoding the downsampled data 212. In some examples, the first apparatus 202 outputs the correction data, for example for transmission to the second apparatus 204, as well as the encoded signal. This allows the recipient to correct for the errors introduced in encoding and decoding the downsampled data 212. This correction data may also be referred to as a "first enhancement" stream. As the correction data may be based on the difference between the downsampled data 212 and the decoded image it may be seen as a form of residual data (e.g. that is different from the other set of residual data described later below).

In some examples, generating the processed data 213 at the relatively low level of quality further involves correcting the decoded image using the correction data. For example, the correction data as output for transmission may be placed into a form suitable for combination with the decoded image, and then added to the decoded image. This may be performed on a frame-by-frame basis. In other examples, rather than correcting the decoded image using the correction data, the first apparatus 202 uses the downsampled data 212. For example, in certain cases, just the encoded then decoded data may be used and in other cases, encoding and decoding may be replaced by other processing.

In some examples, generating the processed data 213 involves performing one or more operations other than the encoding, decoding, obtaining and correcting acts described above.

The first apparatus 202 obtains data 214 based on the data at the relatively low level of quality. As indicated above, the data at the relatively low level of quality may comprise the processed data 213, or the downsampled data 212 where the downsampled data 212 is not processed at the lower level. As described above, in certain cases, the processed data 213 may comprise a reconstructed video stream (e.g. from an encoding-decoding operation) that is corrected using correction data. In the example of FIGS. 2A and 2B, the data 214 is a second representation of the image at the relatively high level of quality, the first representation of the image at the relatively high level of quality being the input data 206. The second representation at the relatively high level of quality may be considered to be a preliminary or predicted representation of the image at the relatively high level of quality. In this example, the first apparatus 202 derives the data 214 by performing an upsampling operation on the data at the relatively low level of quality. The data 214 will be referred to hereinafter as "upsampled data". However, in other examples one or more other operations could be used to derive the data 214, for example where data 212 is not derived by downsampling the input data 206. It should be noted that the references to relatively high and relatively low levels of quality may correspond to references to a first and second level of quality, where the second level of quality is higher than the first level of quality. As described herein, in certain cases, the levels of quality may correspond to different spatial resolutions.

The input data 206 and the upsampled data 214 are used to obtain residual data 216. The residual data 216 is associated with the image. The residual data 216 may be in the form of a set of residual elements. A residual element in the set of residual elements 216 may be associated with a respective image element in the input data 206. An example of an image element is a pixel.

In this example, a given residual element is obtained by subtracting a value of an image element in the upsampled data 214 from a value of a corresponding image element in the input data 206. As such, the residual data 216 is useable in combination with the upsampled data 214 to reconstruct the input data 206. The residual data 216 may also be referred to as "reconstruction data" or "enhancement data". In one case, the residual data 216 may form part of a "second enhancement" stream.

The first apparatus 202 obtains configuration data relating to processing of the residual data 216. The configuration data indicates how the residual data 216 has been processed and/or generated by the first apparatus 202 and/or how the residual data 216 is to be processed by the second apparatus 204. The configuration data may comprise a set of configuration parameters. The configuration data may be useable to control how the second apparatus 204 processes data and/or reconstructs the input data 206 using the residual data 216. The configuration data may relate to one or more characteristics of the residual data 216. Different configuration data may result in different processing being performed on and/or using the residual data 216. The configuration data is therefore useable to reconstruct the input data 206 using the residual data 216.

In this example, the first apparatus 202 transmits to the second apparatus 204 data based on the downsampled data 212, data based on the residual data 216, and the configuration data, to enable the second apparatus 204 to reconstruct the input data 206.

Turning now to FIG. 2B, the second apparatus 204 receives data 220 based on (e.g. derived from) the downsampled data 212. The second apparatus 204 also receives data based on the residual data 216. For example, the second apparatus 204 may receive a "base" stream (data 220), a "first enhancement stream" (any correction data) and a "second enhancement stream" (residual data 216). The second apparatus 204 also receives the configuration data relating to processing of the residual data 216. The data 220 based on the downsampled data 212 may be the downsampled data 212 itself, the processed data 213, or data derived from the downsampled data 212 or the processed data 213. The data based on the residual data 216 may be the residual data 216 itself, or data derived from the residual data 216.

In some examples, the received data 220 comprises the processed data 213, which may comprise the encoded image at the relatively low level of quality and/or the correction data. In some examples, for example where the first apparatus 202 has processed the downsampled data 212 to generate the processed data 213, the second apparatus 204 processes the received data 220 to generate processed data 222. Such processing by the second apparatus 204 may comprise decoding an encoded image (e.g. that forms part of a "base" encoded video stream) to produce a decoded image at the relatively low level of quality. In some examples, the processing by the second apparatus 204 comprises correcting the decoded image using obtained correction data. Hence, the processed data 222 may comprise a frame of corrected data at a first or relatively low level of quality. In some examples, the encoded image at the relatively low level of quality is decoded by a decoding device that is separate from the second apparatus 204. The encoded image at the relatively low level of quality may be decoded using an H.264 decoder.

In other examples, the received data 220 comprises the downsampled data 212 and does not comprise the processed data 213. In some such examples, the second apparatus 204 does not process the received data 220 to generate processed data 222.

The second apparatus 204 uses data at the relatively low level of quality to derive the upsampled data 214. As indicated above, the data at the relatively low level of quality may comprise the processed data 222, or the received data 220 where the second apparatus 204 does not process the received data 220 at the relatively low level of quality. The upsampled data 214 is a preliminary representation of the image at the relatively high level of quality. The upsampled data 214 may be derived by performing an upsampling operation on the data at the relatively low level of quality.

The second apparatus 204 obtains the residual data 216. The residual data 216 is useable with the upsampled data 214 to reconstruct the input data 206. The residual data 216 is indicative of a comparison between the input data 206 and the upsampled data 214.

The second apparatus 204 also obtains the configuration data related to processing of the residual data 216. The configuration data is useable by the second apparatus 204 to reconstruct the input data 206. For example, the configuration data may indicate a characteristic or property relating to the residual data 216 that affects how the residual data 216 is to be used and/or processed, or whether the residual data 216 is to be used at all. In some examples, the configuration data comprises the residual data 216.

There are several considerations relating to the use of such configuration data. One such consideration is the amount of information that is generated, stored, transmitted and/or processed. The more information that is used, the greater the amount of resources that may be involved in handling such information. Examples of such resources include transmission resources, storage resources and processing resources. Compared to some known techniques, examples described herein allow a relatively small amount of information to be used. This may reduce the amount of data transmitted via the data communications network 106. The savings may be particularly relevant where the data relates to high quality video data, where the amount of information transmitted in known systems can be especially high.

Another consideration relating to the use of such configuration data is the amount and/or the relative complexity of processing involved at the encoder and/or the decoder in order to process the configuration data. Compared to some known techniques, examples described herein reduce an amount and/or a complexity of processing performed by the encoder and/or the decoder in order to obtain and/or process the configuration data. Simplifying the processing performed by the encoder and/or the decoder increases an efficiency of the encoder and/or the decoder.

Figure 3:
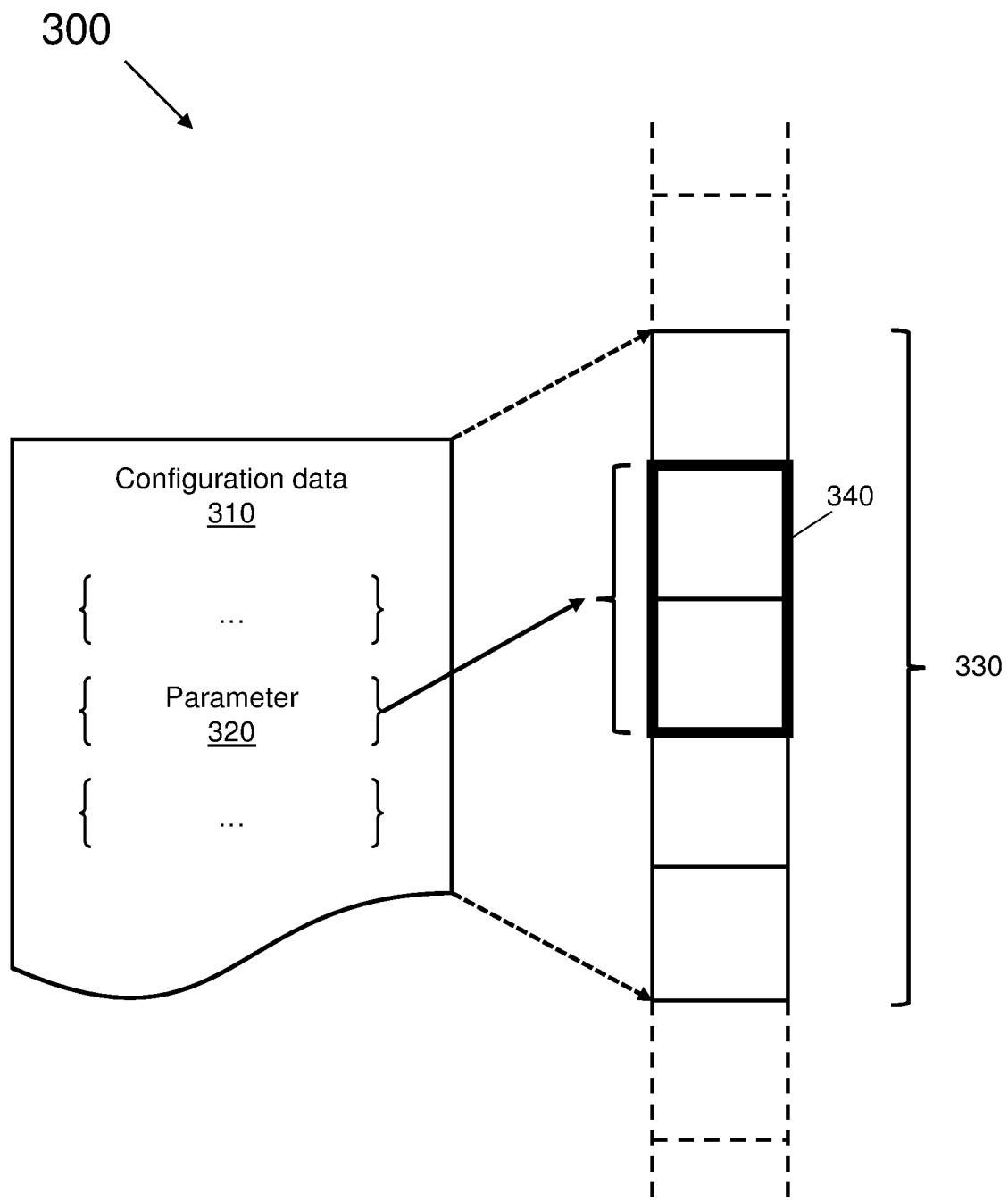
FIG. 3 shows a schematic diagram of an example of a data processing technique in accordance with an embodiment of the present invention.

Referring to FIG. 3, there is shown schematically an example of a data processing technique 300. The data processing technique 300 may be performed by an apparatus comprising an encoder such as the first apparatus 102 described above. The data processing technique 300 involves performing byte-wise processing of configuration data, as described in more detail below.

Configuration data 310 is obtained. The configuration data 310 is related to processing of residual data, for example residual data 216 as described above.

The configuration data 310 comprises a value of a configuration parameter 320. In this example, the configuration data 310 also comprises values of further configuration parameters. The value of the configuration parameter 320 has a variable bit-length. As such, the number of bits useable to represent the value of the configuration parameter 320 varies based on the value of the configuration parameter 320.

In some examples, the value of the configuration parameter 320 specifies a version number. The version may be a version of a syntax according to which the configuration data 310 is arranged. The syntax may be considered a framework that defines how the configuration data 310 is to be processed and/or defines the configuration parameters that are to be included in the configuration data 310. The encoder 108 and/or the decoder 110 may be configured to operate in accordance with the version of the syntax indicated by the configuration parameter 320.

In some examples, the configuration parameter 320 relates to a size of a payload part of a configuration message. The configuration message may be generated by the encoder 108 in order to contain the configuration data 310 and/or to convey the configuration data 310 to the decoder 110. The configuration message may comprise a header part and a payload part. The header part may include the configuration parameter that specifies the size of the payload part. The size of the payload part has a variable bit-length.

In some examples, the residual data 216 is encoded using one or both of a run-length encoding operation and a Huffman encoding operation. Encoding the residual data 216 derives encoded residual data. The encoded residual data may be output for processing by the decoder 110. In some examples, the configuration parameter 320 relates to a size of the encoded residual data. For example, the configuration parameter 320 may relate to a size of run-length encoded data and/or a size of Huffman encoded data.

The configuration data 310 is arranged into a sequence of bytes 330. The sequence of bytes 330 comprises an integer number of bytes. In this example, the configuration data 310 is arranged into a sequence of bytes comprising 5 bytes, although it will be understood that other numbers of bytes may be used in other examples. In this example, a given byte in the sequence of bytes 330 comprises 8 bits. The sequence of bytes 330 may be part of a larger byte sequence or byte-wise stream. Arranging the configuration data 310 into a sequence of bytes 330 enables byte-wise processing to be performed on the configuration data 310. In byte-wise processing, data is processed on a byte-by-byte basis.

Processing the configuration data 310 in a byte-wise manner may be more efficient than processing the configuration data 310 in a bit-wise manner. Bit-wise processing may involve tracking which bit within a given byte is the next bit to be read or written. When a group of bits that represents a given parameter straddles a byte boundary, additional processing may be performed in order to read the group of bits and obtain the given parameter. Such processing may be reduced in a case where byte-wise processing is performed. In some examples, a number of execution cycles may be reduced when processing data in a byte-wise manner compared to a bit-wise manner.

In some examples, the sequence of bytes 330 is written to memory. The sequence of bytes 330 may be written to memory to be processed by a transport layer of a protocol stack. Less processing may be involved in storing the configuration data 310 in memory and/or in retrieving the configuration data 310 from memory if the configuration data 310 is handled in a byte-by-byte manner compared to a case in which the configuration data 310 is handled in a bit-by-bit manner. The smallest unit of addressable memory may comprise one byte. As such, information may be stored in memory in a byte-wise manner. Therefore, fewer steps may be involved in storing the configuration data 310 in memory and/or in retrieving the configuration data 310 from memory if the configuration data 310 is packaged into a sequence of bytes. An amount of padding used to package the configuration data 310 into addressable memory units may also be reduced by providing the configuration data 310 to the memory in a byte-wise form.

Furthermore, transmission of the configuration data 310 via a network such as the Internet may be performed more efficiently if the configuration data 310 is arranged into a sequence of bytes. Data may be transmitted over the Internet via the Transmission Control Protocol (TCP). TCP operates in a transport layer of a protocol stack. TCP obtains data from a stream, packages the data into TCP segments and uses an internet module, for example the Internet Protocol (IP), to transmit each TCP segment to a recipient via the Internet. The data stream may be obtained from memory. A TCP segment may comprise an integer number of bytes. As such, less processing may be involved if the TCP obtains the data that is to be packaged into the TCP segments from a byte-wise stream than from a bit-wise stream. An amount of padding used to package the data into TCP segments may also be reduced by providing the data to the TCP in a byte-wise form.

In this example, arranging the configuration data 310 into the sequence of bytes 330 is performed at an application layer of a protocol stack. As such, the application layer may process the configuration data 310 in a byte-by-byte manner instead of a bit-by-bit manner.

In this example, the sequence of bytes 330 comprises a variable-length element 340. The variable-length element 340 comprises an integer number of bytes in the sequence of bytes 330. In this example, the variable-length element 340 comprises two bytes. The variable-length element may comprise other numbers of bytes in other examples. The variable-length element may be referred to as a "multi-byte" element, although in some examples the variable-length element comprises a single byte. The one or more bytes of the variable-length element 340 may be contiguous in the sequence of bytes 330. In some examples, the one or more bytes of the variable-length element 340 are non-contiguous in the sequence of bytes 330.

The variable-length element 340 is arranged to store the value of the configuration parameter 320 having the variable-bit length.

At least one given byte of the variable-length element 340 has one or more predetermined bits arranged to indicate whether or not the variable-length element 340 comprises one or more additional bytes to the at least one given byte. In this example, the one or more predetermined bits comprises a single predetermined bit. In other examples, the one or more predetermined bits comprises more than one predetermined bit. In some examples, each byte of the variable-length element 340 comprises the one or more predetermined bits. In other examples, at least one byte of the variable-length element 340 does not comprise the one or more predetermined bits.

In a case where the one or more predetermined bits comprises a single predetermined bit, the single predetermined bit may be considered a flag that indicates whether or not the one or more additional bytes are present in the variable-length element 340. For example, if the variable-length element 340 contains an additional byte to the at least one given byte, the value of the predetermined bit may be set to 1. If, on the other hand, the variable-length element 340 does not contain an additional byte to the at least one given byte, the value of the predetermined bit may be set to 0. In other words, the predetermined bit indicates whether the variable-length element 340 extends beyond the at least one given byte.

As such, the value of the configuration parameter 320 may be represented using the variable-length element 340 regardless of the bit-length of the value of the configuration parameter 320. The variable-length element 340 comprises the minimum number of bytes that are useable to store the value of the configuration parameter 320. The use of the variable-length element 340 may therefore reduce an amount of information that is stored, processed and/or transmitted compared to a case in which a fixed-length element is used that has a size that corresponds to a maximum conceivable bit-length of the value of configuration parameter 320. The variable-length element 340 enables the number of possible values that can be used to represent the configuration parameter 320 to be increased as necessary and in a flexible manner. As such, the variable-length element 340 may be used to provide for future developments and/or modifications to the configuration data 310, for example by allowing for an increase in the bit-length of the value of the configuration parameter 320, without the need for relatively complex modifications to the data processing technique 300.

In the example shown in FIG. 3, the variable-length element 340 comprises two bytes. In this example, the first byte of the variable-length element 340 contains a predetermined bit that indicates that the second byte is comprised in the variable-length element 340. The second byte of the variable-length element 340 contains a predetermined bit that indicates that no additional bytes to the first and second bytes are comprised in the variable-length element 340. When the sequence of bytes 330 is processed by the decoder 110, the first byte of the variable-length element 340 may be read before the second byte of the variable-length element 340. Based on the indication provided by the predetermined bit in the first byte of the variable-length element 340, the decoder 110 determines that the second byte is also part of the variable-length element 340. The second byte is then read. Based on the indication provided by the predetermined bit in the second byte, the decoder 110 determines that the next byte is not part of the variable-length element 340, and that the reading of the variable-length element 340 is therefore complete.

The one or more predetermined bits may be arranged at an end of the at least one given byte. For example, the one or more predetermined bits may comprise one or more last bits of the at least one given byte. In some examples, the one or more predetermined bits comprises one or more first bits of the at least one given byte. In some examples, each of the at least one given byte comprises seven bits arranged to store the value of the configuration parameter 320 and one bit arranged to indicate whether or not the variable-length element 340 comprises one or more additional bytes to the at least one given byte.

The value of the configuration parameter 320 may be stored in the variable-length element 340 in response to determining that the value of the configuration parameter 320 has a predetermined relationship with a predetermined threshold value. In some examples, the predetermined relationship comprises the value of the configuration parameter 320 being greater than or equal to the predetermined threshold value. In some examples, if it is determined that the value of the configuration parameter 320 does not have the predetermined relationship with the predetermined threshold value, the value of the configuration parameter 320 is stored in a fixed-length element instead of in the variable-length element 340. The fixed-length element comprises a predetermined integer number of bytes. As such, the variable-length element 340 may be included selectively.

The predetermined threshold value may be related to the bit-length of the fixed-length element. For example, if the fixed-length element comprises a single byte, values between 0 and 255 may be represented by the fixed-length element. The predetermined threshold value in such a case may be 255, for example. As such, if the value of the configuration parameter having the variable bit-length is greater than 255, the variable-length element 340 may be used instead of or in addition to the fixed-length element to store the value of the configuration parameter 320. In other words, the fixed-length element and the variable-length element may be used to store the value of the configuration parameter 320.

The sequence of bytes 330 comprising the variable-length element 340 is output for processing by the decoder 110 to enable the decoder 110 to reconstruct the input data 206 using the configuration data 310.

Figure 4:
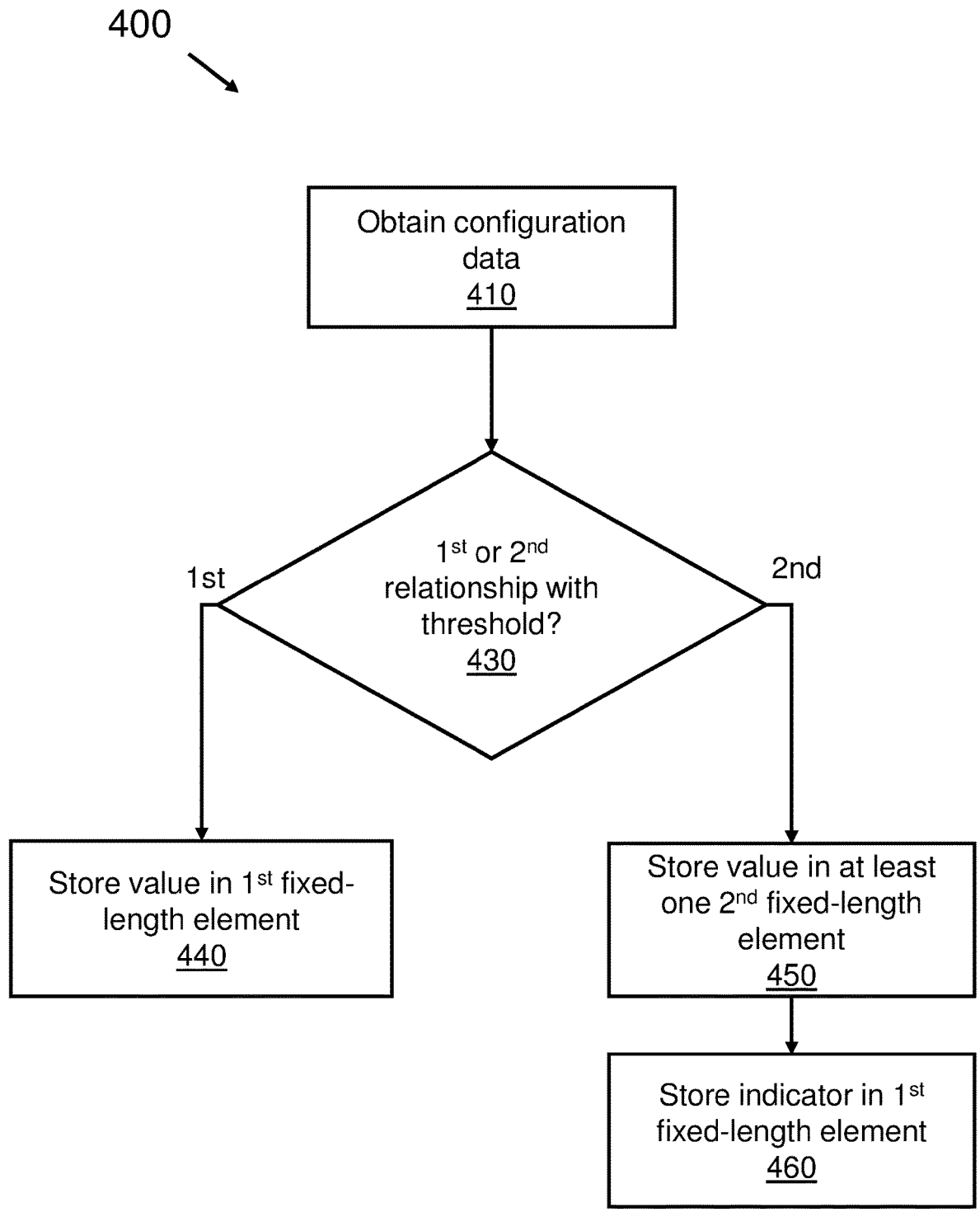
FIG. 4 is a flow diagram depicting an example of a method in accordance with an embodiment of the present invention.

Referring to FIG. 4, there is shown an example of a method 400 of processing configuration data. The method 400 may be performed by an apparatus comprising an encoder such as the first apparatus 102 described above.

In some examples, residual data 216 is obtained. The residual data 216 is useable by the decoder 110 to reconstruct the input data 206 using the upsampled data 214.

At item 410, configuration data is obtained. The configuration data is related to processing of the residual data 216. The configuration data is useable by the decoder 110 to reconstruct the input data 206 using the upsampled data 214.

A value of a configuration parameter comprised in the obtained configuration data is determined. The value of the configuration parameter may have a variable bit-length.

At item 430, it is determined whether the value of the configuration parameter has a first or a second predetermined relationship with a predetermined threshold value.

In this example, the first predetermined relationship comprises the value of the configuration parameter being less than the predetermined threshold value. In this example, the second predetermined relationship comprises the value of the configuration parameter being greater than or equal to the predetermined threshold value.

In response to determining that the value of the configuration parameter has the first predetermined relationship with the predetermined threshold value, the value of the configuration parameter is stored at item 440 in a first fixed-length element. The first fixed-length element is then output for processing by the decoder 110. The first fixed-length element may comprise an integer number of bytes. In some examples, the first fixed-length element has a length of one byte. The length of the first fixed-length element does not depend upon the value of the configuration parameter.

In some examples, a reference to a look-up table that stores possible values of the configuration parameter is stored in the first fixed-length element. For example, the first fixed-length element may comprise a value that is useable to obtain the value of the configuration parameter from the look-up table.

In response to determining that the value of the configuration parameter has the second predetermined relationship with the predetermined threshold value, the value of the configuration parameter is stored at item 450 in at least one second fixed-length element. The at least one second fixed-length element comprises an integer number of bytes. Each of the at least one second fixed-length element may have a length of one byte. The at least one second fixed-length element may be considered to be a variable-length element, since the at least one second fixed-length element is formed of a variable number of fixed-length elements. The total length of the at least one second fixed-length element depends upon the value of the configuration parameter. In some examples, the at least one second fixed-length element comprises the minimum number of bytes that are useable to store the value of the configuration parameter.

At item 460, data is stored in the first fixed-length element that is arranged to indicate that the value of the configuration parameter is stored in the at least one second fixed-length element. In some examples, the data comprises at least one predetermined bit of the first fixed-length element. The data stored in the first fixed-length element enables the decoder 110 to determine that the value of the configuration parameter is stored in the at least one second fixed-length element.

As such, the value of the configuration parameter is stored in the at least one second fixed-length element selectively. That is, the at least one second fixed-length element may be used only when the first fixed-length element is insufficient to store the value of the configuration parameter. Using the at least one second fixed-length element selectively may reduce an amount of information that is used, stored and/or transmitted compared to a case in which the at least one second fixed-length element is used regardless of the value of the configuration parameter.

The first fixed-length element and the at least one second fixed-length element are output for processing by the decoder 110. The first fixed-length element and, when the value of the configuration parameter has the second predetermined relationship with the predetermined threshold value, the at least one second fixed-length element, may be arranged into a sequence of bytes. The sequence of bytes may be output for processing by the decoder 110.

The decoder 110 receives the first fixed-length element and determines, based on the content of the first fixed-length element, whether the value of the configuration parameter is stored in the first fixed-length element or in the at least one second fixed-length element. In some examples, in response to the predetermined bit of the first fixed-length element having a first value, the decoder 110 may determine that the value of the configuration parameter is stored in the first fixed-length element. In response to the predetermined bit having a second value, the decoder 110 may determine that the value of the configuration parameter is stored in the at least one second fixed-length element. In some examples, in response to the value of the configuration parameter having the first predetermined relationship with the predetermined threshold value, the decoder 110 may determine that the value of the configuration parameter is stored in the first fixed-length element. In response to the value of the configuration parameter having the second predetermined relationship with the predetermined threshold value, the decoder 110 may determine that the value of the configuration parameter is stored in the at least one second fixed-length element. Having determined whether the value of the configuration parameter is located in the first or the at least one second fixed-length element, the decoder 110 is then able to obtain the value of the configuration element.

Figure 5:
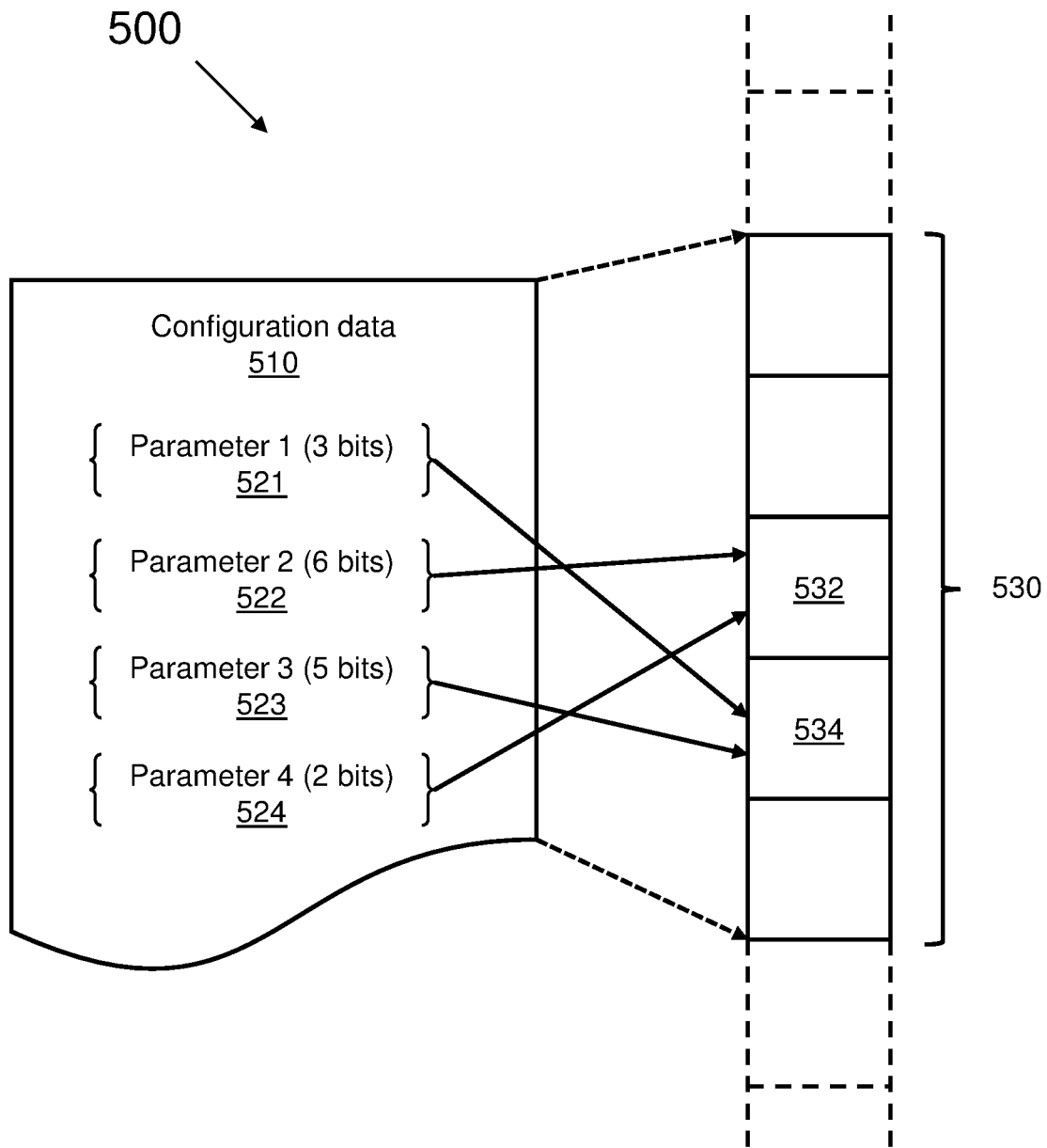
FIG. 5 shows a schematic diagram of an example of a data processing technique in accordance with an embodiment of the present invention.

Referring to FIG. 5, there is shown schematically an example of a data processing technique 500. The data processing technique 500 may be performed by an apparatus comprising an encoder such as the first apparatus 102 described above. Some items depicted in FIG. 5 are similar to items shown in FIG. 3. Corresponding reference signs, incremented by 200, have therefore been used for similar items.

Configuration data 510 is obtained. The configuration data 510 relates to processing of residual data 216.

The configuration data 510 comprises values of a plurality of configuration parameters 521, 522, 523, 524. Although in this example four configuration parameters are depicted, in other examples other numbers of configuration parameters are comprised in the configuration data 510. In this example, the values of the configuration parameters 521, 522, 523, 524 are represented by different bit-lengths. In other examples, some of the values of the configuration parameters 521, 522, 523, 524 are represented by a same bit-length. In this specific example, configuration parameter 521 has a value that is represented by a bit-length of 3 bits, configuration parameter 522 has a value that is represented by a bit-length of 6 bits, configuration parameter 523 has a value that is represented by a bit-length of 5 bits, and configuration parameter 524 has a value that is represented by a bit-length of 2 bits.

The configuration data 510 is packed into a sequence of bytes 530. The configuration data 510 is packed by arranging the values of the configuration parameters 521, 522, 523, 524 in a predetermined order. The predetermined order may be a different order than an order in which the configuration parameters 521, 522, 523, 524 are obtained. As such, the configuration parameters 521, 522, 523, 524 may be re-arranged.

The values of the configuration parameters 521, 522, 523, 524 are arranged such that a given byte in the sequence of bytes 530 is filled by the values represented by the different bit-lengths. In this specific example, configuration parameter 522 and configuration parameter 524 are packed into a first byte 532 in the sequence of bytes 530. The combined bit-length of the values of configuration parameter 522 and configuration parameter 524 is eight bits. Therefore, the first byte 532 is completely filled by the combination of configuration parameter 522 and configuration parameter 524. Similarly, configuration parameter 521 and configuration parameter 523 are packed into a second byte 534 in the sequence of bytes 530. The combined bit-length of the values of configuration parameter 521 and configuration parameter 523 is eight bits. Therefore, the second byte 534 is completely filled by the combination of configuration parameter 521 and configuration parameter 523.

By filling a given byte in the sequence of bytes 530 with values represented by different bit-lengths arranged in a predetermined order, an amount of padding used in the sequence of bytes 530 is reduced. As such, data is packed more efficiently into the sequence of bytes 530 compared to a case in which the values represented by the different bit-lengths are not arranged in the predetermined order.

Packing data more efficiently into the sequence of bytes 530 may reduce a number of bytes that are used to store the configuration data 510.

In a comparative case where the values represented by the different bit-lengths are not re-arranged into the predetermined order, a first byte in the sequence of bytes 530 stores the value of configuration parameter 521 along with 5 bits of padding, since the combined bit-length of the values of configuration parameter 521 and configuration parameter 522 is greater than 8 bits. A second byte in the sequence of bytes 530 stores the value of configuration parameter 522 along with 2 bits of padding, since the combined bit-length of the values of configuration parameter 522 and configuration parameter 533 is greater than 8 bits. A third byte in the sequence of bytes 530 may then store the values of configuration parameter 523 and configuration parameter 524, along with 1 bit of padding. Therefore, three bytes are used to store the values of the four configuration parameters 521, 522, 523, 524 in this comparative case, compared to only two bytes when the values are re-arranged into the predetermined order. Packing the configuration data 510 into the sequence of bytes 530 according to the predetermined order therefore reduces an amount of information that is to be transmitted to the decoder 110.

Figure 6:
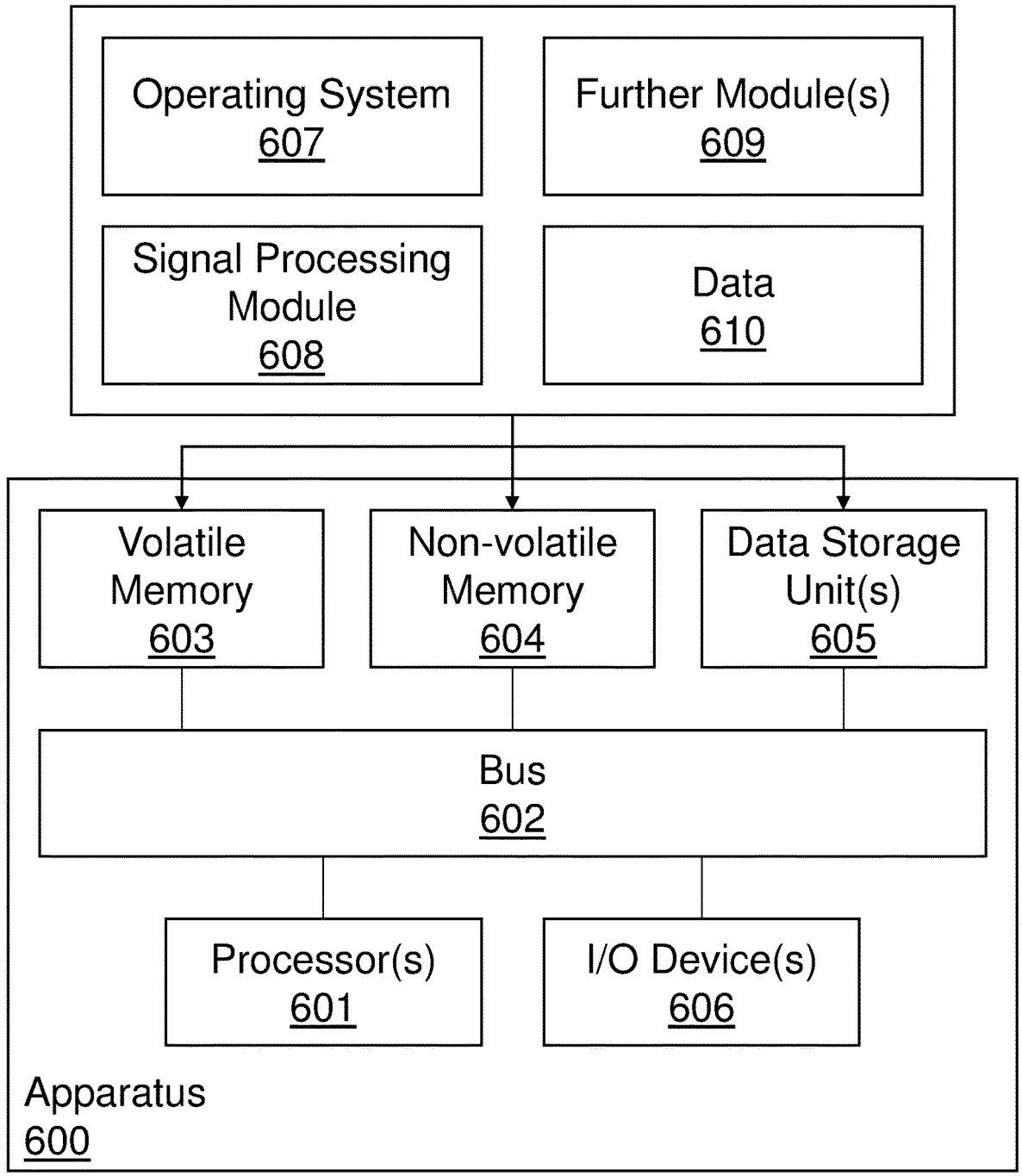
FIG. 6 shows a schematic block diagram of an example of an apparatus in accordance with an embodiment of the present invention.

Referring to FIG. 6, there is shown a schematic block diagram of an example of an apparatus 600.

In an example, the apparatus 600 comprises an encoder. In another example, the apparatus 600 comprises a decoder.

Examples of apparatus 600 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, or in general any type of computing or electronic device.

In this example, the apparatus 600 comprises one or more processors 601 configured to process information and/or instructions. The one or more processors 601 may comprise a central processing unit (CPU). The one or more processors 601 are coupled with a bus 602. Operations performed by the one or more processors 601 may be carried out by hardware and/or software. The one or more processors 601 may comprise multiple co-located processors or multiple disparately located processors.

In this example, the apparatus 600 comprises computer-useable volatile memory 603 configured to store information and/or instructions for the one or more processors 601. The computer-useable volatile memory 603 is coupled with the bus 602. The computer-useable volatile memory 603 may comprise random access memory (RAM).

In this example, the apparatus 600 comprises computer-useable non-volatile memory 604 configured to store information and/or instructions for the one or more processors 601. The computer-useable non-volatile memory 604 is coupled with the bus 602. The computer-useable non-volatile memory 604 may comprise read-only memory (ROM).

In this example, the apparatus 600 comprises one or more data-storage units 605 configured to store information and/or instructions. The one or more data-storage units 605 are coupled with the bus 602. The one or more data-storage units 605 may for example comprise a magnetic or optical disk and disk drive or a solid-state drive (SSD).

In this example, the apparatus 600 comprises one or more input/output (I/O) devices 606 configured to communicate information to and/or from the one or more processors 601.

The one or more I/O devices 606 are coupled with the bus 602. The one or more I/O devices 606 may comprise at least one network interface. The at least one network interface may enable the apparatus 600 to communicate via one or more data communications networks. Examples of data communications networks include, but are not limited to, the Internet and a Local Area Network (LAN). The one or more I/O devices 606 may enable a user to provide input to the apparatus 600 via one or more input devices (not shown). The one or more input devices may include for example a remote control, one or more physical buttons etc. The one or more I/O devices 606 may enable information to be provided to a user via one or more output devices (not shown). The one or more output devices may for example include a display screen.

Various other entities are depicted for the apparatus 600. For example, when present, an operating system 607, data signal processing module 608, one or more further modules 609, and data 610 are shown as residing in one, or a combination, of the computer-usable volatile memory 603, computer-usable non-volatile memory 604 and the one or more data-storage units 605. The data signal processing module 608 may be implemented by way of computer program code stored in memory locations within the computer-usable non-volatile memory 604, computer-readable storage media within the one or more data-storage units 605 and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 600 may therefore comprise a data signal processing module 608 which can be executed by the one or more processors 601. The data signal processing module 608 can be configured to include instructions to implement at least some of the operations described herein. During operation, the one or more processors 601 launch, run, execute, interpret or otherwise perform the instructions in the signal processing module 608.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the apparatus 600 may comprise more, fewer and/or different components from those depicted in FIG. 6.

The apparatus 600 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of performing byte-wise processing of configuration data, the method comprising:
   obtaining configuration data useable by a decoder to reconstruct a first representation of an image at a first level of quality in a tiered hierarchy having multiple levels of quality using a second representation of the image at the first level of quality, the second representation being based on a representation of the image at a second, lower level of quality in the tiered hierarchy, the configuration data comprising a value of a configuration parameter, the value having a variable bit-length;
   arranging the configuration data into a sequence of bytes, wherein the sequence of bytes comprises a variable-length element arranged to store the value of the configuration parameter having the variable bit-length, the variable-length element comprising at least one given byte having one or more predetermined bits arranged to indicate whether or not the variable-length element comprises one or more additional bytes to the at least one given byte; and
   outputting the sequence of bytes for processing by the decoder to enable the decoder to reconstruct the first representation using the configuration data.

2. A method according to claim 1, wherein the one or more predetermined bits comprises a single predetermined bit.

3. A method according to claim 1, wherein the one or more predetermined bits comprises one or more first bits of the at least one given byte.

4. A method according to claim 1, wherein each of the at least one given byte comprises seven bits arranged to store the value of the configuration parameter having the variable bit-length and one bit arranged to indicate whether or not the variable-length element comprises the one or more additional bytes.

5. A method according to claim 1, the method comprising storing the value of the configuration parameter having the variable bit-length in the variable-length element in response to the apparatus determining that the value of the configuration parameter having the variable bit-length has a predetermined relationship with a predetermined threshold value.

6. A method according to claim 5, wherein the predetermined relationship comprises the value of the configuration parameter being greater than or equal to the predetermined threshold value.

7. A method according to claim 1, wherein the configuration data is related to processing of residual data derived based on the first representation and the second representation, the residual data being useable by the decoder to reconstruct the first representation using the second representation.

8. A method according to claim 7, the method comprising encoding the residual data using a run-length encoding operation and/or a Huffman encoding operation to derive encoded residual data, wherein the configuration parameter having the value stored in the variable-length element relates to a size of the encoded residual data.

9. A method according to claim 1, wherein the configuration parameter having the value stored in the variable-length element relates to: a version of a syntax according to which the configuration data is arranged; or a size of a payload part of a configuration message, the configuration message containing the configuration data.

10. A method of performing byte-wise processing of configuration data, the method comprising:
receiving a sequence of bytes comprising configuration data, the configuration data being useable to reconstruct a first representation of an image at a first level of quality in a tiered hierarchy having multiple levels of quality using a second representation of the image at the first level of quality, the second representation being based on a representation of the image at a second, lower level of quality in the tiered hierarchy, the configuration data comprising a value of a configuration parameter, the value having a variable bit-length; and
processing the sequence of bytes to reconstruct the first representation using the configuration data,
wherein the sequence of bytes comprises a variable-length element arranged to store the value of the configuration parameter having the variable bit-length, the variable-length element comprising at least one given byte having one or more predetermined bits arranged to indicate whether or not the variable-length element comprises one or more additional bytes to the at least one given byte.

11. A method according to claim 10, wherein the one or more predetermined bits comprises a single predetermined bit.

12. A method according to claim 10, wherein the one or more predetermined bits comprises one or more first bits of the at least one given byte.

13. A method according to claim 10, wherein each of the at least one given byte comprises seven bits arranged to store the value of the configuration parameter having the variable bit-length and one bit arranged to indicate whether or not the variable-length element comprises the one or more additional bytes.

14. A method according to claim 10, wherein the value of the configuration parameter having the variable bit-length is stored in the variable-length element in response to a determination that the value of the configuration parameter having the variable bit-length has a predetermined relationship with a predetermined threshold value.

15. A method according to claim 14, wherein the predetermined relationship comprises the value of the configuration parameter being greater than or equal to the predetermined threshold value.

16. A method according to claim 10, wherein the configuration data is related to processing of residual data derived based on the first representation and the second representation, the residual data being useable to reconstruct the first representation using the second representation.

17. A method according to claim 10, wherein the configuration parameter having the value stored in the variable-length element relates to a size of encoded residual data, the encoded residual data having been derived using a run-length encoding operation and/or a Huffman encoding operation.

18. A method according to claim 10, wherein the configuration parameter having the value stored in the variable-length element relates to a version of a syntax according to which the configuration data is arranged.

19. A method according to claim 10, wherein the configuration parameter having the value stored in the variable-length element relates to a size of a payload part of a configuration message, the payload part of the configuration message containing the configuration data.

20. An apparatus configured to:
receive a sequence of bytes comprising configuration data, the configuration data being useable to reconstruct a first representation of an image at a first level of quality in a tiered hierarchy having multiple levels of quality using a second representation of the image at the first level of quality, the second representation being based on a representation of the image at a second, lower level of quality in the tiered hierarchy, the configuration data comprising a value of a configuration parameter, the value having a variable bit-length; and
process the sequence of bytes to reconstruct the first representation using the configuration data,
wherein the sequence of bytes comprises a variable-length element arranged to store the value of the configuration parameter having the variable bit-length, the variable-length element comprising at least one given byte having one or more predetermined bits arranged to indicate whether or not the variable-length element comprises one or more additional bytes to the at least one given byte.

* * * * *